United States Patent Office 2,767,152
Patented Oct. 16, 1956

2,767,152

GASKET COMPOSITION, INCLUDING BOTH HYDROCARBON SOLUBLE AND INSOLUBLE RUBBERS

Clarence R. Bierman, Villa Park, and Raymond E. Mietz, Melrose Park, Ill., assignors to American Can Company, New York, N. Y., a corporation of New Jersey No Drawing. Application April 10, 1953,
Serial No. 348,094

2 Claims. (Cl. 260—27)

The present invention deals with fluid compositions and the films cast therefrom. More specifically this invention appertains to compositions containing an organic solvent-soluble synthetic rubber, an organic solvent-insoluble synthetic rubber and a tackifying resin which, when cast into a film and the organic solvent evaporated therefrom, form a gasket material for metal container end-closures having improved fat resistance and excellent resistance to moist heat.

It is therefore an object of this invention to provide a can-end-lining compound having excellent lining characteristics.

It is a further object of this invention to provide a gasket material for metal container end-closures having improved properties of fat resistance and excellent properties of resistance to moist heat.

Numerous other objects and advantages of the invention will be apparent as it is better understood from the following description which is of a preferred embodiment thereof.

United States Patent 2,593,681 issued to Arthur J. Leydon discloses the principle of increasing the rubber content of a fluid composition while maintaining a relatively low viscosity by utilizing two different rubbers having different solubility characteristics in a given organic solvent. However, we have made the surprising discovery that a composition containing a major portion of soluble, synthetic rubber and a minor portion of the insoluble, synthetic rubber exhibits properties heretofore not found in can-end-gaskets. This discovery enables the production of a can-end-lining compound having proper viscosity and lining characteristics for present day high speed production and yields a can-end-gasket that is tough and durable and has remarkable resistance to deterioration in steam-flow-closure operations of fatty substances.

The synthetic rubbers used in this invention are well known in the art. Butadiene-styrene copolymer rubber is the soluble rubber and is known also as GR-S and Buna S. As the insoluble rubber, any of the following synthetic rubber polymers may be used: butadiene-acrylonitrile rubbery copolymer, known also as Buna N, Hycar and Paracril; neoprene, i. e. polymerized monochlorobutadiene or chloroprene; a copolymer of acrylonitrile and an acrylic acid ester known commercially as Acrylon produced by the American Monomer Corp.; and a copolymer of an acrylic acid ester and chloroethylvinyl ether known commercially as Hycar 4021 and produced by the B. F. Goodrich Company.

In the composition of the present invention, the ratio of soluble to insoluble rubber should be between 2.0 to 1 and 5.0 to 1, and preferably between 3.5 to 1 and 4.5 to 1. This ratio is critical and upon it depends the success of the finished can-end-gasket to act as an efficient seal. The inclusion of the organic solvent-insoluble rubbers is necessary to give fat and oil resistance. However, the combination of the soluble and insoluble rubber has less cohesive strength than the soluble rubber alone. This feature is advantageous when lining can-ends at high speeds since it reduces the tendency of the Buna S to string at the nozzle. On the other hand, the reduction in cohesive strength is a disadvantage in the finished can-end-gasket since if the reduction is too great, a weak, frangible gasket results which will not effectively withstand the strain of end closing operations. Therefore the optimum soluble/insoluble rubber ratio disclosed above must be adhered to carefully in order to obtain the desired results.

The resistance of can-end-gaskets to moist heat is of prime importance. In can closing operation, immediately before joining the can-end to the can-body, the space between the two is swept with steam. For this period the can-end-gasket is in direct contact with the steam and unless the gasket is resistant to such moist heat, rapid deterioration thereof would take place. It is the function of the tackifying resin to prevent such deterioration and to afford this moist heat resistance. For the purpose of this invention, by tackifying resin we mean a resin having: adhesive qualities so as to bind together the other ingredients; at least some degree of compatibility with the rubber in the compound; solubility in the organic solvent used; and a melting point above 212° F. As the preferred tackifying resin we employ a zinc resinate produced by the reaction of zinc oxide and a rosin acid. Other useful tackifying resins are: pinene polymers, coumarone-indene polymers; organic-solvent-soluble phenol-aldehyde resins, phenol-cashew nut shell oil resins and aldehyde-cashew nut shell oil resins capable of being converted catalytically to insoluble resins; aluminum resinates; and rosins such as dimerized rosin, ester gum having an acid number of 50 and above and polymerized ester gum.

As pointed out above, the ratio of soluble rubber to insoluble rubber is critical. So also is the amount of tackifying resin. Since the tackifying resin is soluble, at least to some extent, in fats and oils, the amount that can be present in the gasket composition is limited so as not to destroy the improved fat resistance of the composition. On the other hand sufficient tackifying resin must be present to give the moist heat resistance. We have found that satisfactory results are obtained if the weight ratio of tackifying resin to insoluble rubber is in the range of from 1.5:1 to 7.5:1 and preferably between 3:1 and 6:1.

The selective solvent used in the present invention may be any organic liquid inert towards the ingredients of the compositions, in which the Buna S is soluble while the Buna N, neoprene, Acrylon and Hycar 4021 are not and is also sufficiently volatile so that it may be readily removed from the composition, especially by the application of heat. Examples of such liquids are petroleum naphtha, hexane, isohexane, pentane, heptane isoheptane, octane, and mixtures thereof. Small amounts of methyl-ethyl ketone may be added to these hydrocarbon solvents if desired to improve their properties. However, the choice of solvent is not critical provided it meets the above requirements.

The other ingredients which may be added to the end-lining compound of this invention are: a filler such as Buca clay, a rubber antioxidant such as an arylamine, and a pigment such as carbon black.

The following example is by way of illustration and is in no way intended to limit the scope of the invention.

*First cycle*

4.55 pounds of a mixture of 99% butadiene-acrylonitrile rubber polymer and 1% di-beta-naphthyl-para-phenylenediamine rubber antioxidant are added to a mixture of 18 pounds of butadiene-styrene rubber copolymer, 0.18 pound of the above antioxidant and 0.06 pound of carbon black and the whole thoroughly mixed in a Banbury mixer. Into this, 8.6 pounds of zinc oxide is intimately mixed. The entire mixture is then dumped, sheeted and cooled for approximately two hours.

*Second cycle*

9.3 pounds of Buca is then thoroughly mixed into 24 pounds of the first cycle stock in a suitable manner, e. g. Banbury mixer. This mixture is then placed into a Struthers-Wells mixer and 18.5 pounds of zinc resinate in four gallons of petroleum naphtha is added with constant agitation. Additional solvent is added from time to time with continued mixing until a homogeneous mass is obtained i. e. the solubles are all in solution and the insolubles are uniformly dispersed throughout the mass. At this point the insoluble rubber exists in the composition as a dispersion of discrete, exceedingly fine particles. When such a homogeneous mass is obtained, it is diluted with additional solvent to the proper viscosity.

A tabulation of the proportions of the above composition is as follows:

| Ingredient | Wt. Percent in Fluid Cpd. | Lbs. per Gallon |
| --- | --- | --- |
| butadiene-styrene elastomer | 9.28 | 0.635 |
| butadiene-acrylonitrile elastomer | 2.32 | 0.159 |
| zinc oxide | 5.74 | 0.394 |
| Buca | 6.26 | 0.428 |
| rosin acid | 11.22 | 0.771 |
| di-beta-naphthyl-para-phenylenediamine | 0.12 | 0.008 |
| carbon black | 0.06 | 0.004 |
| solvent | 65.00 | 4.451 |
| | 100.00 | 6.850 |

The solids content of the can-end-lining compound is preferably between 34% and 40% of the total weight of fluid composition. The viscosity of the fluid composition is preferably between 800 and 1000 centipoises for the best efficiency when lining can-ends at high speed.

The specific gravity of the finished can-end-gasket is about 1.30 and the weight of gasket per size 303 can-end is from 55 to 65 mg.

Numerous variations, modifications and advantages of the present invention will be apparent from the specification to one skilled in the art. However, the specification is by way of explanation and description only, the breadth of the present invention being determined solely by the scope of the appended claims.

We claim:

1. A gasket composition for sealing end closures onto a metal can body, comprising a hydrocarbon solvent insoluble rubber selected from the group consisting of a butadiene-acrylonitrile copolymer, polychloroprene, an acrylic acid ester-acrylonitrile copolymer, and an acrylic acid ester-chloroethyl vinyl ether copolymer, from 2 to 5 parts by weight per part of said insoluble rubber of a hydrocarbon solvent soluble butadiene-styrene elastomer, and from 1.5 to 7.5 parts by weight per part of said insoluble rubber of a tackifying resin selected from the group consisting of a rosin, an ester gum, a zinc resinate, an aluminum resinate, a pinene polymer, a coumarone-indene polymer, a phenol-aldehyde polymer, a phenol-cashew nut shell oil polymer, and an aldehyde-cashew nut shell oil polymer, the said last three mentioned polymers being utilized in an organic solvent soluble state.

2. A gasket material for hermetically sealing end closure members onto a metal can body, comprising a hydrocarbon solvent insoluble butadiene-acrylonitrile elastomer, from 2 to 5 parts by weight per part of said insoluble elastomer of a butadiene-styrene elastomer, and from 1.5 to 7.5 parts by weight per part of said insoluble elastomer of a zinc resinate.

References Cited in the file of this patent

UNITED STATES PATENTS

| | | |
| --- | --- | --- |
| 2,399,804 | Hills | May 7, 1946 |
| 2,401,015 | Perkins | May 28, 1946 |
| 2,512,697 | Te Grotenhius | June 27, 1950 |
| 2,521,361 | Gessler | Sept. 5, 1950 |
| 2,588,993 | Schroeder | Mar. 11, 1952 |
| 2,593,681 | Leydon | Aug. 22, 1952 |
| 2,610,162 | Hoffman | Sept. 9, 1952 |
| 2,692,245 | Groves | Oct. 19, 1954 |
| 2,696,447 | Bezman | Dec. 7, 1954 |